Sept. 27, 1932.  T. K. RICHARDS ET AL  1,879,498
CASSETTE FOR X-RAY WORK
Filed Aug. 12, 1930   2 Sheets-Sheet 1
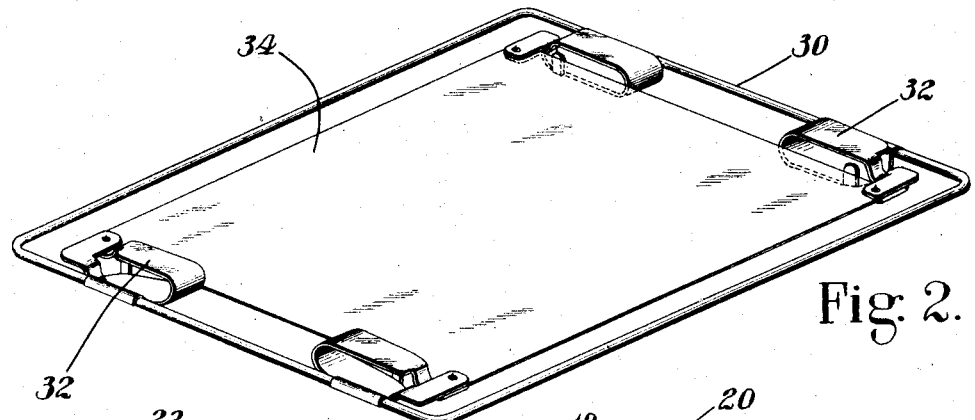
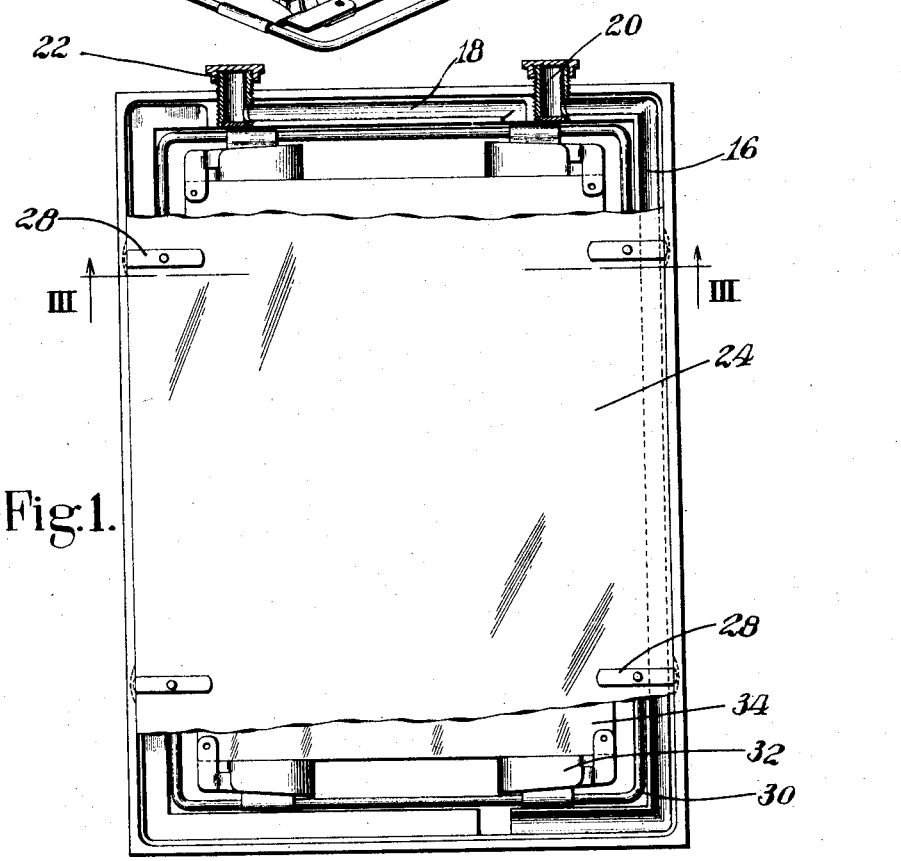
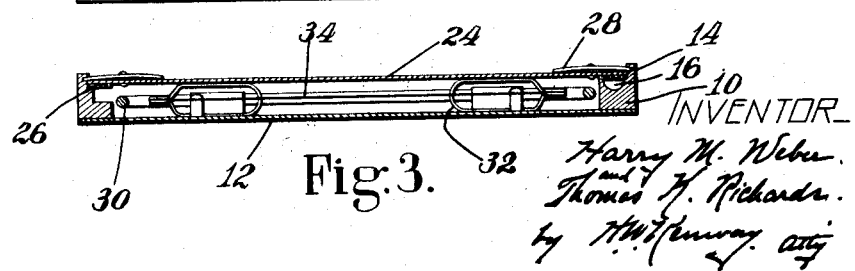

Sept. 27, 1932.  T. K. RICHARDS ET AL  1,879,498
CASSETTE FOR X-RAY WORK
Filed Aug. 12, 1930    2 Sheets-Sheet 2
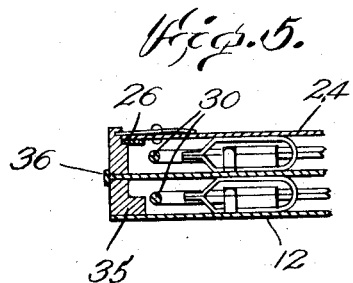
Fig. 5.
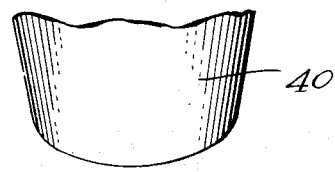
Fig. 4.
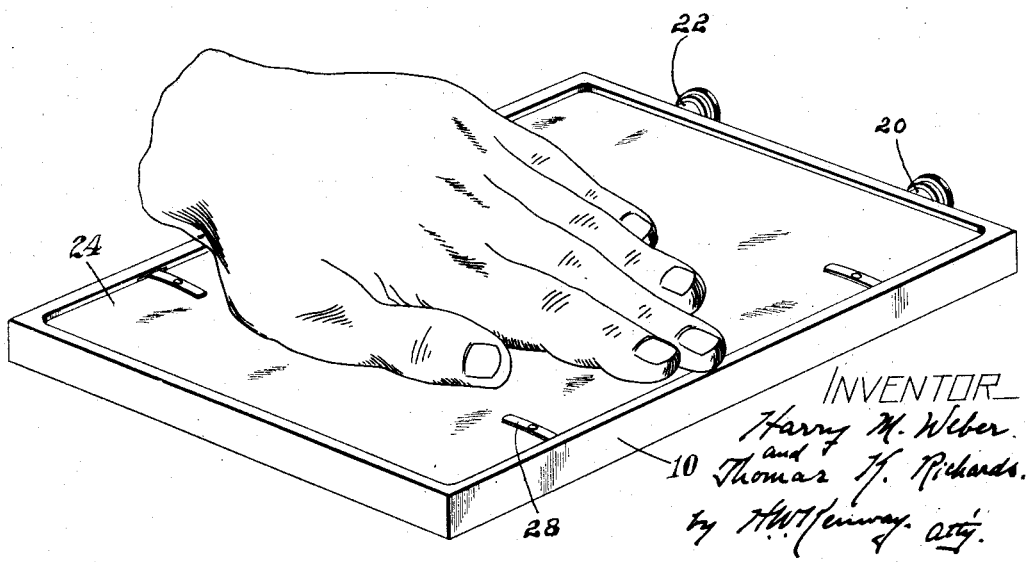

Patented Sept. 27, 1932

1,879,498

UNITED STATES PATENT OFFICE

THOMAS K. RICHARDS, OF LEXINGTON, AND HARRY M. WEBER, OF NEWTON, MASSACHUSETTS

CASSETTE FOR X-RAY WORK

Application filed August 12, 1930. Serial No. 474,840.

This invention relates to a film holder or cassette for use in X-ray photography and in one aspect consists in a novel film holder so constructed and arranged that it may serve the purposes of contacting with the member to be X-rayed, of supporting a sensitized plate or film in position to be exposed, and of receiving and containing liquid for developing, fixing and washing the same.

Cassettes as heretofore used contain the film to be exposed, positioned within a light-tight chamber. The film is supported and positioned between one side of the cassette and a removable cover. They are constructed of aluminum or other material having the property of screening out some of those rays which would otherwise impair the sharpness of the negative. Usually, the cassette containing the film is arranged to support the member to be X-rayed. The X-ray beam is then directed through the member and passes thence through the wall of the cassette in reaching the film. The film, after having been thus exposed, is removed from the cassette, usually placed in a frame, and developed, washed and fixed in a dark room by means of suitable solutions and apparatus. This procedure is unsatisfactory as it involves the expense of maintaining and installing a suitable dark room. Furthermore, in removing the film from the cassette and inserting it into the supporting frame for development, there is always the danger of mutilating or scratching the exposed film, particularly as both sides of an X-ray film are normally sensitized.

In many cases, it is inadvisable to move the patient to the X-ray laboratory; consequently, in order to secure Röntgengrams of such a patient it is necessary to expose films usually in cassettes by means of a portable Röntgenray unit which is brought to the patient. The exposed film must then be returned to the laboratory or suitable dark room. This involves time and it is conceivable that films so taken would not show the desired part satisfactorily. By means of the present invention, it is possible to expose, develop and fix the plate or film at the patient's bedside so that all information that is to be secured from the plate or film may be instantly available.

In other words, by means of the present invention the necessity and availability of a dark room for developing, fixing and washing of X-ray films in either the laboratory or at any place the patient may be is no longer necessary. By having available at the patient's bedside the completed, satisfactory Röntgengram it is possible to reduce the number of exposures to the X-rays and thereby minimize the danger of over-exposure of the patient to these rays.

Furthermore, this will obviate repeated changes in the patient's position or other disturbance which may be detrimental to his health or life.

The purpose of the present invention is to provide a cassette in which each film may be developed in the field, wherever the patient may be, as soon as it has been exposed and to this end an important feature of the invention consists in a light-tight and water-tight frame having a flat metal wall with ray-screening properties adapted to contact with the member to be X-rayed, together with means within the frame for holding a sensitized film and passages in the frame for admitting a developing or fixing liquid to the film. A cassette of this construction may be used exactly as cassettes heretofore known in the X-ray operation; that is to say, the member to be X-rayed may rest upon the cassette or its flat face may press against the member defining the field of the X-ray. After the negative has been exposed, however, it may be at once developed by pouring a developing liquid into the cassette, and this may then be removed and followed by a fixing liquid. The developed negative may then be removed and studied, while the cassette may be drained and re-loaded in a bag or other light-proof container with a fresh film.

These and other features of the invention will be best understood and appreciated from the following description of a preferred embodiment thereof, selected for purposes of illustration and shown in the accompanying drawings, in which Fig. 1 is a view in elevation of my improved cassette with part of the cover broken away;

Fig. 2 is a view in perspective of the film holder;

Fig. 3 is a sectional view on the line 3—3 of Fig. 1;

Fig. 4 is a view in perspective illustrating the operation of X-raying one hand of the patient.

Fig. 5 is a fragmentary view in section illustrating a multiple form of cassette.

The cassette herein illustrated is provided with a holder for a sensitized film but it will be understood that it would be within the scope of the invention to modify it to receive a plate and that for purposes of this invention the two may be considered as identical.

The cassette comprises a frame including a body portion 10, a rear wall 12 and a movable cover 24. In the construction of the cassette aluminum may be employed or any material having the requisite ray-screening properties. The side walls of the frame are of substantial thickness and provided with open channels 16 and 18 which, when closed by the cover plate 24, form ducts. The duct 16 extends along one side of the frame and opens in the bottom thereof. At its upper end it communicates with an inlet plug 20 so that fluid supplied at this point will be delivered to the bottom of the cassette and may rise in it in such a manner as to remove air bubbles from the film. The other channel 18 is contained entirely in the upper part of the frame and communicates with an outlet plug 22 by which the cassette may be drained after the developing or fixing operations.

The film holder comprises a wire frame 30 so proportioned as to fit within the inner walls of the frame. It is provided at diametrically opposite points with four spring clips 32 having a pin and socket which are separated when the clip is compressed and which cooperate to impale the film when the clip is released. It will be apparent from an inspection of Fig. 2 that the film 34 is suspended smoothly within the holder and supported thereby midway between the wall and cover of the frame and out of contact with both.

The side walls of the frame are shaped to provide a peripheral rib or shoulder upon which the cover plate 24 is supported in position with an interposed gasket 26 of rubber or other flexible material which insures a watertight joint. The cover plate is provided near each corner with a clip or button 28 pivotally mounted thereon and arranged to engage an undercut slot in the side wall of the frame. By swinging the clips 28 into a vertical position, as viewed in Fig. 1, the cover plate may be released and removed, affording access to the interior of the cassette for the purpose of removing or replacing the film holder.

The manner of using our improved cassette will be apparent from the foregoing description in connection with Fig. 4, which is intended to suggest the X-raying operation. The operator will require in his equipment a single cassette and a supply of sensitized films, together with a bag or similar appliance for re-loading the cassette, and developing and fixing liquid in convenient containers. Having positioned a fresh film in the holder and placed the latter in the cassette, the member to be X-rayed, as, for example, the hand shown in Fig. 4, may be placed upon the cassette or the latter may be otherwise brought into contact with it. The X-ray beam delivered from the tube 40 is then directed through the hand of the patient, passing through the latter and through the cover plate 24 of the cassette to reach and expose the film 34. In its passage through the cover 24, some of the objectionable rays which would tend to obscure the definition of the negative are screened out. Having completed the exposure, developing liquid is supplied through the inlet 20, rising from the bottom of the cassette along the surface of the film and developing same. The developing liquid is then drained from the cassette, water admitted to remove the developer adhering to the film and apparatus, the wash water drained, and the fixing operation similarly carried out. When this has been effected, the cover 24 may be removed and the exposed negative is available for study at once by the operator. The film may later be washed free of fixing solution in any suitable manner. Meanwhile, the cassette may be reloaded with a fresh film and in the ensuing X-ray operation the operator has the benefit of the prior exposed film in arranging the member to be X-rayed in any new or different position that may be desirable.

We have described our cassette as supplied with a single film at a time but it will be understood that it would be within the scope of the invention to employ two or more films or plates and to separate these by removable lead shutters, so manipulated as to permit all of the films or plates to be exposed successively and then developed simultaneously. A multiple cassette of this character is of particular advantage where a number of exposures are to be made when, for example, prints of a member in a number of positions is desired.

A cassette adapted for containing two films is shown in Fig. 5. In this construction the body portion 35 of the cassette is of sufficient width to inclose two film frames 30, one above another and separated by a removable lead shutter 36; otherwise the construction of the cassette is as already disclosed.

The size of the film employed is dependent upon the size of the member to be X-rayed. The cassette which is the subject matter of the present invention may be of any desired size. In a portable apparatus where, for example, a cassette capable of employing any size film would be desirable, the clips on the frame for supporting the film may be made movable so as to slide to any desired point. In this case, the film is automatically centered in the cassette and is another feature of the present invention.

Having thus described our invention, what we claim as new and desire to secure by Letters Patent is:

1. A cassette for X-ray work comprising a light-tight frame having a flat wall with ray-screening properties adapted to contact with the member to be X-rayed, a holder within the frame for a sensitized film, and a liquid-tight cover cooperating with the sides of the frame to form passages for a developing liquid.

2. A cassette for X-ray work comprising a light-tight and liquid-tight frame adapted to serve as a receptacle for developing fluid and having a flat metal wall with ray-screening properties adapted to contact with the member to be X-rayed, means within the frame for holding a sensitized film in position parallel to said wall, and passages in the frame for admitting a developing liquid to the film.

3. A cassette for X-ray work comprising a light-tight and water-tight frame having a removable cover and including a flat metal portion with ray-screening properties adapted to make direct contact with the member to be X-rayed, a film holder within the frame arranged to be held in place by the cover, and a passage in the frame for conducting a developing liquid to the lower portion thereof.

4. A cassette for X-ray work comprising a shallow frame adapted to underlie a member to be X-rayed and having one flat side formed as a cover, a removable holder for positioning a sensitized film out of contact with the walls of the frame, and ducts opening into the interior of the frame at opposite ends thereof.

5. A cassette for X-ray work comprising a shallow aluminum frame with a removable water-tight cover and side walls having open channels therein arranged to be converted into ducts for liquid when the cover is in place, the cover and the opposite wall of the frame constituting flat surfaces either of which may directly contact with the member to be X-rayed and having ray-screening properties, and a film holder for supporting a sensitized film midway between the cover and the wall of the frame.

6. A cassette for X-ray work comprising a shallow frame forming a fluid tight receptacle adapted to receive developing fluid and having flat parallel walls having ray-screening properties, either of said walls being adapted for direct contact with the member to be X-rayed, a film holder arranged yieldingly to engage the walls of the frame and position a film between the two, and passages in the frame disposed entirely without the area of the film holder.

In testimony whereof we affix our signatures.

THOMAS K. RICHARDS.
HARRY M. WEBER.